Patented June 17, 1952

2,601,023

UNITED STATES PATENT OFFICE 2,601,023

PREPARATION OF TUNGSTEN CARBIDE

Dallas T. Hurd, Schenectady, N. Y., assignor to General Electric Company, a corporation of New York No Drawing. Application June 6, 1950, Serial No. 166,554

2 Claims. (Cl. 23—208)

The present invention relates to the preparation of metal carbide. More particularly it is concerned with the preparation of tungsten or molybdenum carbides of a controlled particle size.

It is known that finely divided metal powders can be made by pyrolysis of the vapors of metal carbonyls in a heated space. It is also known that a metal carbide such as tungsten carbide can be prepared by the reaction of a metal powder such as tungsten powder with suitable carbonizing agents such as carbon monoxide, benzene and the like.

In general the products obtained by pyrolysis of the vapors of metal carbonyls are extremely finely divided materials having a particle size ordinarily less than a small fraction of a micron.

The present invention has as its principal object the preparation of carbides of tungsten of a controlled particle size ranging from about ½ to 20 microns. A further object of the invention is to produce the carbide of tungsten of controlled particle size and of substantial purity and containing no free carbon.

It has been discovered that the above objects can be attained by a process which comprises subjecting solid particles of tungsten carbonyl to pyrolysis and thereafter subjecting the pyrolysis products to a balanced atmosphere capable of converting all or substantially all thereof to the desired tungsten carbide.

When tungsten carbonyl vapor is injected into a heated chamber at a temperature of from 650 to 1100° C. there is obtained a pyrolysis product in the form of finely divided powders of tungsten or tungsten carbides depending upon the reaction conditions. The particle size of these powders as determined by examination with an electron microscope will be found to be from about ½ micron down to the limit of resolution of the instrument, the bulk of the material being only a small fraction of a micron in size.

In accordance with the present invention, the tungsten carbonyl in the form of a finely divided solid material is introduced into a heated zone having a temperature ranging from 650 to 1000° C. Further, in order to obtain a carbide product within the range of from ½ to 20 microns in diameter, the metal carbonyl subjected to the pyrolysis is selected to have a particle size of at least approximately five times that desired in the final products. In other words in order to obtain a carbide having a particle size ranging from 2 to 10 microns, it is necessary to start with the solid carbonyl having a particle size ranging from about $\frac{1}{10}$th to ½ mm.

For example, when tungsten carbonyl in the form of discrete crystalline particles within the range of particle sizes referred to hereinbefore is dropped or injected into the heated pyrolysis chamber, the pyrolysis product is found to be in the form of a powder of much larger particle size that that obtained by pyrolysis of a carbonyl vapor. The measured particle size of carbides prepared from tungsten carbonyl crystals of 1 mm. in size range from about 1 to 20 microns with a greater amount of the material occurring in the size range of about 4 to 10 microns. When somewhat smaller crystals of carbonyl were pyrolyzed under the same conditions, the average dimension of these crystals being from $\frac{1}{20}$th to $\frac{1}{50}$th mm., the pyrolysis product obtained was in the particle size range of from about ½ to 8 microns with the bulk of the material being in the range of from 2 to 4 microns.

The effect of temperature on the size of the pyrolysis products was not particularly noticeable, at least within the operating temperatures of from 650 to 1000° C.

The apparatus employed in carrying out the present invention should be so constructed as to permit the introduction of suitable gases to be described more fully hereinafter and to prevent the access of air or other oxidizing gases.

The products obtained by pyrolysis of the solid tungsten carbonyl are ordinarily mixtures including some free metal, one or more metal carbides and in some cases a small amount of the metal oxide. To obtain a substantially pure metal carbide of the formula WC, for example, it is necessary to heat the pyrolysis products in an atmosphere adapted to convert these various components into the desired carbide. Further, in order to assure that the finely divided tungsten produced by the thermal decomposition of tungsten carbonyl will be converted to the desired carbide of tungsten, and that no free tungsten, free carbon, or tungsten oxide will be in the product, it is necessary to control the temperature and the composition of the gaseous atmosphere in the reaction chamber during this treatment.

For the preparation of the tungsten carbide, WC, the chemical reactions involved are:

I. $\quad W+2CO \rightleftharpoons WC+CO_2 \quad K_I$
II. $\quad \frac{1}{3}W+CO_2 \rightleftharpoons \frac{1}{3}WO_3+CO \quad K_{II}$
III. $\quad 2CO \rightleftharpoons C+CO_2 \quad K_{III}$ These reactions are all equilibrium reactions whose equilibrium constants are known at various temperatures or can be calculated at various temperatures. The temperature range of interest with regards to WC, for example, is from 800° C. to 1850° C. In this temperature range, the compound WC is the thermodynamically stable form of tungsten carbide. At temperatures outside this range the lower carbide, $W_2C$, is the stable form.

The necessary conditions for achieving the objectives enumerated above at any given temperature for WC are:

For carbide formation, $(CO_2)/(CO)^2$ must be less than $K_I$.

To avoid free carbon, $(CO_2)/(CO)^2$ must be greater than $K_{III}$.

To avoid the formation $(CO)/(CO_2)$ must be greater than $K_{II}$ of tungsten oxide.

As an example of this, consider a system at a temperature of, say, 1000° C. At this temperature the value of $K_I$ is calculated to be 0.39, the value of $K_{II}$ is known to be 0.777, and the value of $K_{III}$ is known to be 0.0083. It will be seen, therefore, that a gas composition of four parts of carbon monoxide and one part of carbon dioxide will satisfy the requirements of the inequalities. With this composition, the ratio $(CO)/(CO_2)$ will be 4, which is larger than $K_{II}$ so that no tungsten oxide will be formed. The ratio $(CO_2)/(CO)^2$ will be 0.0625. Since this value is smaller than $K_I$ the formation of WC will result. Since the value of 0.0625 is larger than the value of $K_{III}$ no free carbon should be formed. Thus it may be seen that the limits of gas composition will be defined at a particular operating temperature by the magnitude of the equilibrium constants for the various possible reactions.

Some representative values of the equilibrium constants at various temperatures are:

| Constant | Temperature, deg. C. | | | |
|---|---|---|---|---|
| | 800° | 900° | 1000° | 1100° |
| $K_I$ | 12.6 | 1.995 | 0.39 | 0.097 |
| $K_{II}$ | 0.626 | 0.653 | 0.777 | 0.785 |
| $K_{III}$ | 0.100 | 0.0255 | 0.0083 | 0.00132 |

Employing the above information, the pyrolysis of tungsten carbonyl at 1000° C. in a gas composition of four parts of carbon monoxide and one part of carbon dioxide will lead to the formation of tungsten carbide, WC, provided that sufficient time is allowed for complete reaction.

It will be understood by those skilled in the art that such a manipulation of the gaseous atmosphere is not confined to a system comprising carbon monoxide and dioxide. Other systems may be used, such as a system comprising hydrogen and methane balanced according to the appropriate reaction equilibria, or a system comprising hydrogen and the oxides of carbon.

Similar calculations are evident for treatment at temperatures other than those specified above, or for the preparation of $W_2C$ or the corresponding molybdenum carbides at the various temperatures favoring the formation of the desired carbide.

What I claim as new and desire to secure by Letters Patent of the United States is:

1. The process of preparing tungsten carbide of a particle size from ½ to 20 microns which comprises introducing into a heated zone at a temperature of 650 to 1100° C., solid particles of tungsten carbonyl of a particle size ranging about five times that desired for the tungsten carbide product and subjecting the resultant pyrolysis products at a temperature in the range of 800–1800° C. to a gaseous atmosphere consisting of a mixture of carbon monoxide and carbon dioxide capable of converting all of the metal component thereof to tungsten carbide.

2. The process of preparing tungsten carbide of a particle size from ½ to 20 microns which comprises introducing into a heated zone at a temperature of 650 to 1100° C., solid particles of tungsten carbonyl of a particle size about five times that desired for the tungsten carbide product, and subjecting the resultant pyrolysis products at a temperature of 1000° C., to a gaseous atmosphere consisting of about four parts carbon monoxide and one part carbon dioxide capable of converting all of the metal components thereof to tungsten carbide.

DALLAS T. HURD.

No references cited.